Oct. 11, 1938.  R. SARDESON  2,132,650
AUTOMATIC TOASTER
Filed April 14, 1937  2 Sheets-Sheet 1
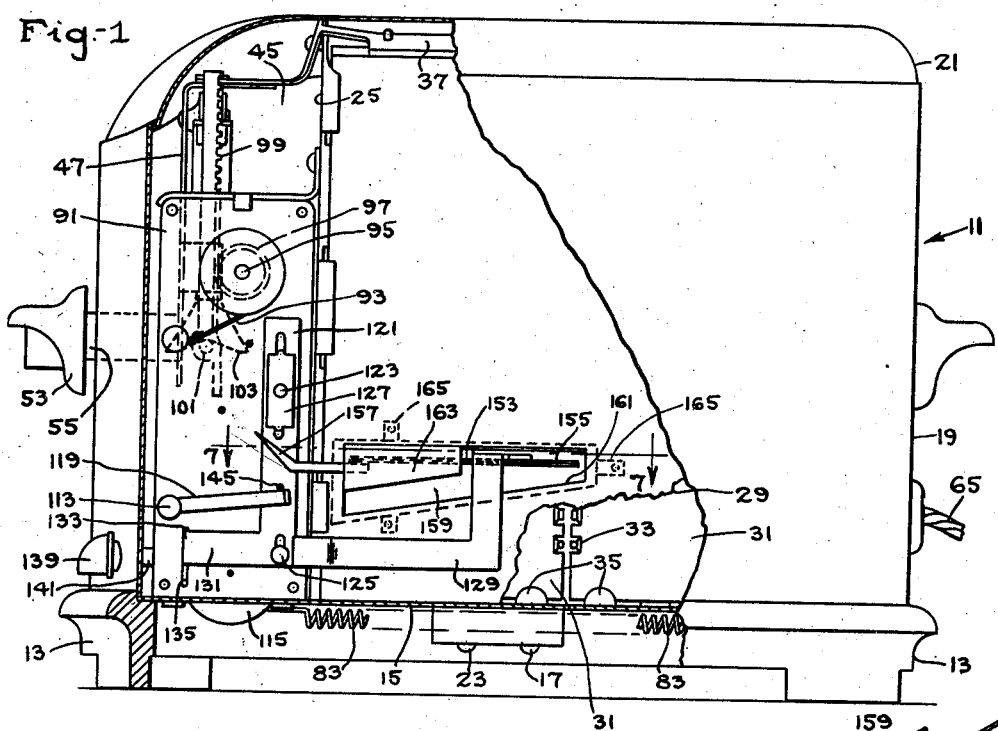
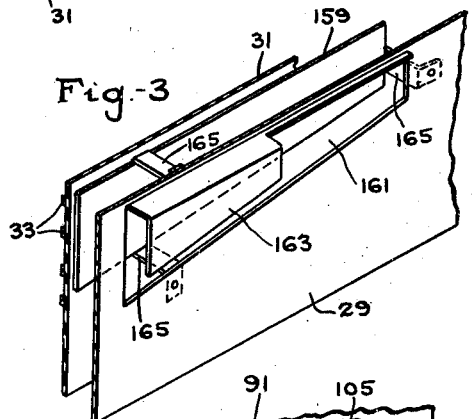
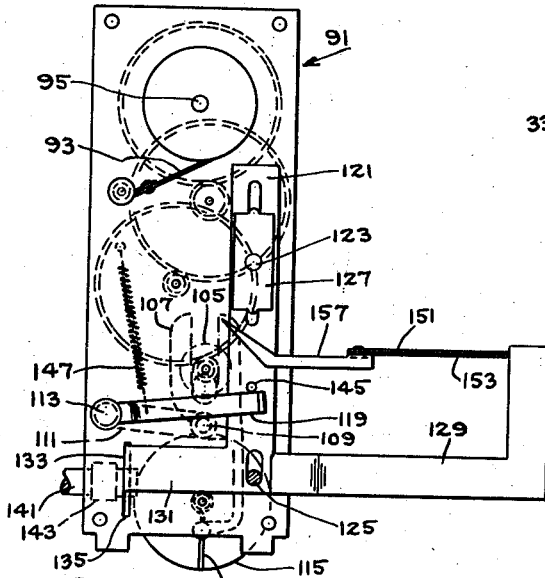
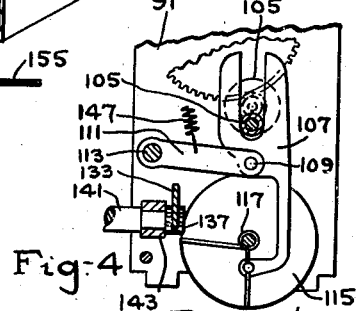
Inventor:
Robert Sardeson
By N. M. Biebel
Attorney Oct. 11, 1938.                R. SARDESON                2,132,650
                            AUTOMATIC TOASTER
                         Filed April 14, 1937           2 Sheets-Sheet 2
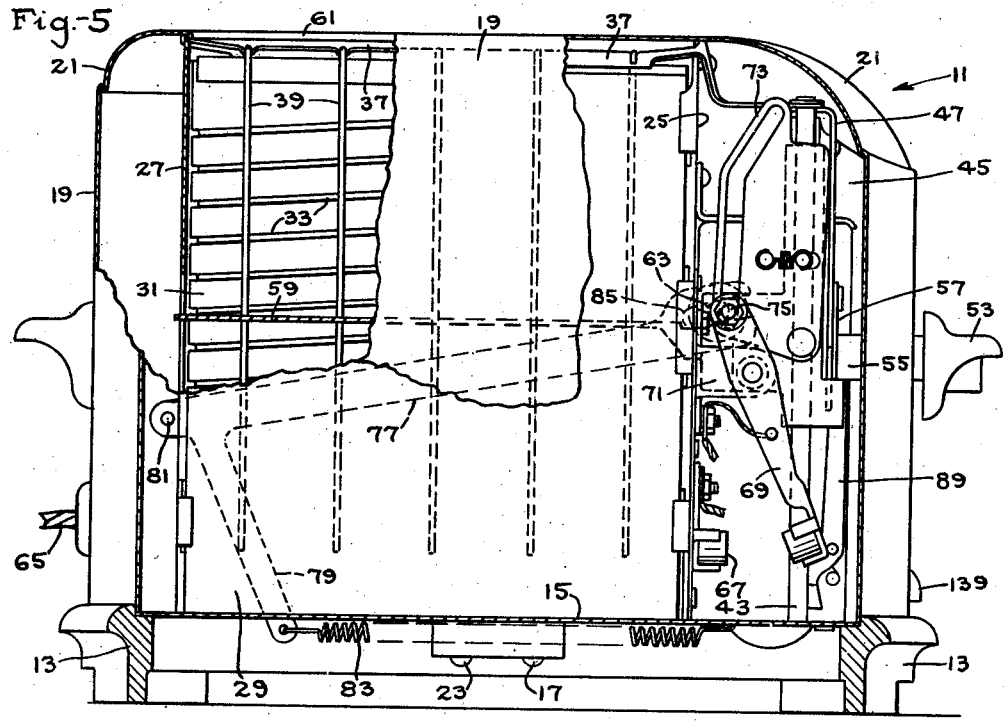
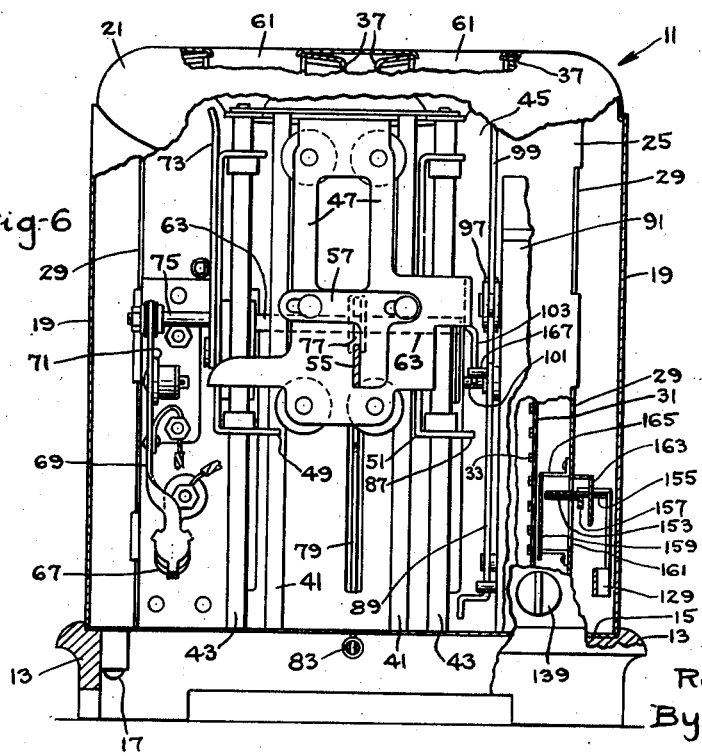
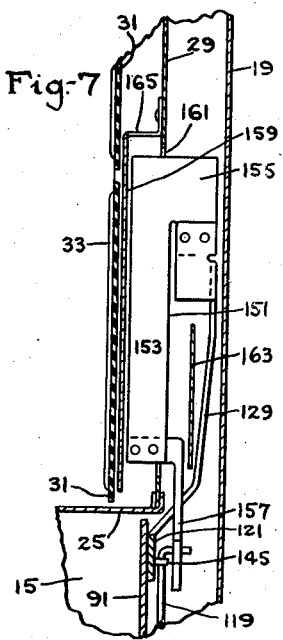
Inventor:
Robert Sardeson.
By J. M. Biebel
Attorney.

Patented Oct. 11, 1938

2,132,650

UNITED STATES PATENT OFFICE 2,132,650

AUTOMATIC TOASTER

Robert Sardeson, Minneapolis, Minn., assignor to McGraw Electric Company, Chicago, Ill., a corporation of Delaware Application April 14, 1937, Serial No. 136,826

18 Claims. (Cl. 219—19)

My invention relates to electric toasters and particularly to thermally-responsive timing mechanisms for electric toasters.

An object of my invention is to provide a unitary thermally-responsive timing mechanism adapted to cooperate with a toaster to vary the duration of an operating period of a toaster in accordance with temperature changes therein.

Another object of my invention is to provide a variable speed mechanical timer with a single speed-adjusting member adapted to be engaged and actuated by manual means as well as by thermally-actuable means.

Another object of my invention is to provide a variable speed mechanical timer having a speed adjusting member adapted to be manually adjustable while maintaining constant the relative positions of a thermostat and of the speed adjusting member.

Another object of my invention is to provide a variable speed mechanical timer adapted to constitute the sole support for a cooperating control thermostat normally free of any externally applied mechanical stress.

Another object of my invention is to provide an automatic toaster including a mechanical timer and a thermally-actuable element cooperating therewith to vary the operating period of the toaster, in which the thermal element is so positioned as to be subjected to relatively high temperature radiant heat transmitted thereto by a plate of relatively small mass and thickness and having high heat-absorbing and heat-radiating capacity.

Other objects of my invention will either be pointed out in the description of one form now preferred by me, or will be apparent from such description.

In the drawings,

Figure 1 is a view, mainly in side elevation, but with portions of the structure cut away, of a toaster embodying my invention, Fig. 2 is a view, in side elevation, of a unitary thermally-controlled timing mechanism on an enlarged scale.

Fig. 3 is a fragmentary perspective view, on an enlarged scale, showing the relative positions of certain parts of the toaster structure, Fig. 4 is a fragmentary interior view, in side elevation, of a part of the timing mechanism, Fig. 5 is a view, in side elevation with parts broken away and partially in section, of a toaster embodying my invention as seen from the side opposite to that of Fig. 1, Fig. 6 is a view in front elevation of a toaster embodying my invention with a part of the front wall of the casing broken away, and, Fig. 7 is a fragmentary view, on an enlarged scale, taken on the line 7—7 of Fig. 1.

A toaster assembly of the vertical oven type designated generally by 11 includes a skeleton base frame 13 which may be made of molded material and a thin base plate 15 secured thereto at the top face thereof, which plate may be held by a plurality of machine screws 17, any desired number of which may be used.

The assembly includes further a casing 19 comprising two side walls and a front and a rear wall together with a cover 21 which may have interfitting engagement with the inturned top edge of casing 19, in a manner well known in the art. The casing 19 may be held against the upper surface of base plate 15 as by a plurality of short machine screws 23, although I do not desire to be limited to such securing and holding means since they constitute no part of my present invention. The toaster includes a front intermediate wall 25, a rear intermediate wall 27 and two intermediate side walls or baffle plates 29, all in a manner now well known in the art, these walls cooperating to define a toasting chamber within the casing 19.

A plurality of heating elements extend substantially vertically within the toaster casing and substantially longitudinally thereof, there being a pair of such electric heating elements for each slice of bread on which the toaster is adapted to operate. Each heating element includes one or more thin plates 31 of electric insulating material, such as mica, on one face of which there is mounted a resistor element 33 of wire or of strip. Substantially all of the length of resistor 33 is located on that face or side of its supporting plate of electric-insulating material facing the cooperating supporting plate so that a slice of bread positioned between such two cooperating heating elements will be subjected to heat from substantially all of the length of the resistor. It may be here pointed out that the amount of energy translated into heat in the respective heating elements is such that the resistor will operate at dull red heat, that is, the slice of bread being toasted will be subjected to relatively high temperature radiant heat.

The lower edges of the plates 31 of electric-insulating material may be positioned by upstanding lugs 35 punched out of base plate 15 and the upper edges of these sheets of electric-insulating material may be held in proper operative positions relatively to each other by depending flanges in horizontally-extending frame members 37 and by hook portions of guard wires 39 having interfitting engagement with the respective frame members 37, all in a manner well known in the art.

The toaster assembly includes also a plurality of inner vertical standards 41 and a pair of outer standards 43 positioned in a mechanism chamber 45 which is defined by the front intermediate wall 25 and the front wall of casing 19. A carriage 47 is vertically movable on the pair of inner standards 41 and is adapted to cause a slider 49 on the left hand standard 43 and a slider 51 on the right hand standard 43 to be moved downwardly when an operator presses on a knob 53 which is suitably mounted on and secured to a forwardly extending portion 55 on a member 57 which is loosely mounted on carriage 47.

Bread supports 59 are vertically movable between the respective pairs of electric heating elements hereinbefore described, it being evident from Fig. 6 of the drawings that I have illustrated a two-slice toaster in which the cover 21 is provided with a pair of openings 61 for insertion and removal of slices of bread. It is obvious that the top frame members 37 are provided with openings registered with the respective openings 61, all in a manner now well known in the art. The guard wires 39 extend through openings in the bread slice supports 59. The bread slice supports are operatively connected by a rod 63 (see Fig. 6 of the drawings) and are thereby secured to the respective sliders 49 and 51 so that downward pressure by an operator on knob 53 will cause downward movement of carriage 47, member 57, sliders 49 and 51 and bread slice supports 59.

Means to control the supply of electric energy to the heating elements through a twin conductor cord 65 includes a circuit-controlling switch comprising a fixed contact member 67 insulatedly mounted on the front intermediate wall 25 and a contact arm 69 also insulatedly mounted on the front intermediate wall 25 and pivotally supported thereon on a bracket 71.

Means for causing turning movement of arm 69 coincident with vertical movement of the carriage and the sliders includes a slotted plate 73 secured at one side of and to slider 49, arm 69 being provided with a rod 75 adapted to have one end fitting in slotted plate 73, the shape of the slot being shown in Fig. 5 of the drawings.

Means for biasing the switch to open position and the bread slice supports to their upper or non-toasting position includes a bell crank lever comprising a substantially horizontally extending arm 77 and a depending arm 79, which bell crank lever is pivotally supported at 81 on the rear intermediate plate 27. A helical spring 83 has one end connected to the outer end of arm 79 and its other end hooked into a part of base plate 15, also in a manner well known in the art. The forward end of arm 77 is slotted as shown at 85 in Fig. 5 of the drawings, the rod 63 being positioned in said slotted forward end so that downward movement of carriage 47 and the associated parts will cause movement of arms 77 and 79 in a clockwise direction (as seen in Fig. 5) downward movement of the bread slice supports and closing of the switch.

Means for holding the switch closed and the bread slice supports in their lower or toasting position includes a projection 87 on slider 51 which projection is adapted to fit below the lower end of a latch arm 89 which latch arm is pivotally mounted on the structure of a mechanical timer 91.

This timer includes a helical spring 93 of substantially the type used in ordinary clocks, which spring is adapted to be wound up on a spring shaft 95 which shaft has a pinion 97 mounted fixedly thereon, which ratchet wheel is engaged by a rack bar 99 having a laterally extending lug 101, which lug is adapted to be operatively engaged by a member 103 of substantially inverted V-shape secured to or being a part of carriage 47 downwardly by pressure on the knob 53 he therefore not only moves downwardly the bread slice supports and closes the control switch but also winds up the spring 93, all of this being already well known in the art.

The timer 91 includes a gear train shown generally only in Fig. 2 of the drawings, which gear train ends in an eccentric 105, which eccentric is adapted to cause oscillating movement of an oscillator 107 which latter is pivotally mounted as at 109 on a pivotally mounted lever arm 111. This lever arm 111 is fixedly mounted on a pin 113 supported by the side plates of timer 91. A balance wheel 115 is adapted to be oscillated by member 107 through a spring 117, it being understood that oscillator 107 can be moved from the position shown in Fig. 4 of the drawings to a position where it is lower than shown in that figure of the drawings to thereby increase the speed of operation of the mechanical timer.

The timer 91 is therefore of the adjustable speed type and I provide means for moving the oscillator 107 in accordance either with the desires of an operator or in accordance with the temperature of the toaster, in order to not only take care of light or dark toast, as may be desired, or different kinds of bread, but also to insure uniform toasting of successive slices of bread with varying temperature of the toaster structure as is now well understood in the art.

A speed adjusting member 119 of substantially L-shape has one end secured to shaft or pin 113 to which it is fixedly secured so that a clockwise turning movement thereof as seen in Figs. 1 and 2 of the drawings will cause an increase in the speed of the timer to thereby shorten the operating period of the toaster.

Means for acting upon the speed adjusting member 119 includes a shiftable bracket 121 guided by mounting pins 123 and 125 (see Fig. 2 of the drawings) this bracket being held by a bowed leaf spring 127 which is interlocked with pin 123. Bracket 121 includes a substantially horizontally extending portion 129 having a forward portion 131, which portion is provided with a lateral projection 133 adapted to fit into and move in a slot 135 in one of the side plates of the timer. The inner edge of projection 133 is provided with teeth which are engaged by a pinion 137 which pinion may be turned manually by a knob 139, the pinion 137 being mounted on a shaft 141 which may be supported by a bearing bracket 143. It is therefore evident that a turning movement of knob 139 will result in vertical movement of bracket 121.

A stop pin 145 is provided in bracket 121 and a tension spring 147 engages arm 111 whereby to bias oscillator 107 to its uppermost or slow position, the position of arm 111 and of speed adjusting member 119 being of course dependent on the vertical position of bracket 121.

A bimetal element 151 is preferably of the kind already disclosed and claimed in my copending application Ser. No. 127,100 filed February 23, 1937, and assigned to the same assignee as is the present application, is supported by an upwardly extending portion of arm 129. Bimetal 151 is of the shape seen more particularly in Fig. 7 of the drawings as comprising a relatively long main arm 153 and a shorter arm 155. The movable end of main bar 153 may have a cam plate 157 secured thereto, the outer end of the cam plate extending angularly relatively to the other part and adapted to engage the speed adjusting member 119. The thermostat 151 is so designed and constructed that it will flex downwardly with increase in temperature of the toaster and of its own temperature and it is therefore evident that as its own temperature increases, it will operatively engage speed adjusting member 119 but only after a predetermined change in temperature. It is so designed and constructed that it operates with a negligible time lag, so that it follows temperature changes, to which it is responsive, faithfully and promptly.

The thermostat 151 is supported in parallel spaced position relatively to the adjacent heating element comprising one or more plates 31 and resistor 33 and is screened from radiant heat emanating directly from the adjacent heating element by a thin plate 159 of thin sheet metal, such as iron or steel. This plate has a relatively small mass and thickness and is of such character that it will receive and transmit heat radiated thereto with only a relatively small time lag. The plate 159 is therefore positioned between the heating element and the thermostat, but since the distance between the heating element and the thermostat is relatively small the heat radiated to the thermostat by plate 159 will be at a temperature which is almost that of the radiant heat given off by the adjacent heating element itself. The baffle plate 29 is provided with an opening 161 therein and a portion of the baffle plate adjacent the opening may be shaped to overhang a part of the thermostat, this portion of the baffle plate being indicated by 163 and shown more particularly in Fig. 3 of the drawings. Plate 159 may be supported in any suitable or desired manner and I have shown it as being supported by portions 165 thereof riveted to baffle plate 29.

Since there is a space between the baffle plate 29, which plate extends downwardly to base plate 15 and upwardly to within a very small distance of cover 21 and the adjacent heating element on one side of the baffle plate, and since there is a space between the baffle plate and the adjacent side wall of casing 19, it is evident that the thermostat will be subjected to closed circuit convection currents of heating air which currents are of different temperatures. The temperature of that convection current of heating air moving upwardly and downwardly between baffle plate 29 and adjacent heating element will have a higher temperature than does the convection current of heating air moving upwardly and downwardly between the baffle plate 29 and the side wall of casing 19.

The thermostat is therefore adapted to be subjected not only to secondary radiant heat caused by the main heating element of the toaster, the temperature of this heat being substantially that or only slightly below that of the heating emanating from or radiated by the heating element itself, but is also adapted to be subjected to convection currents of heating air of relatively high temperature.

As is evident from the figures of the drawings and the description of the structure embodied in the toaster assembly, a manual actuation of knob 139 will cause movement of bracket 121 in either an upwardly or a downwardly direction with action on speed adjusting arm 119. Thus, if the initial position of bracket 121 is as shown in Fig. 2 of the drawings, an operator can so turn knob 139 as to move bracket 121 downwardly, stop pin 145 causing turning movement of speed adjusting member 119 in a clockwise direction to thereby act upon oscillator 107 in such a manner as to cause a change in speed of operation of the timer and in this case an increase in the speed.

It is further evident that the thermostat 151 is also simultaneously moved (e. g. in a downwardly direction) and that, for a constant temperature, its position relatively to speed adjusting member 119 will remain the same during such movement of the bracket. Only after a predetermined change of temperature will cam member 157 be caused to engage speed adjusting member 119 and cause an additional turning movement thereof in a clockwise direction to cause a further increase in speed of operation of the timer and therefore a further decrease in the total operating time of the toaster.

As is already well known in the art, member 103 hereinbefore described is adapted to engage a pin 167 on the upper end of latch 89 after a certain length of time during which carriage 47 has been moved upwardly by the action of rack bar 99 and pin 101 engaging below member 103. The outer and upper edge portion of member 103 is so shaped and positioned that it will cause movement of latch 89 to release slider 51 with which it was interlocked, this release of the latch permitting quick upward movement of the bread slice supports and of the sliders and opening of the control switch for the heating elements.

The device embodying my invention thus provides first of all a novel form of heat source for a thermostatically operative element adapted to control the operating time of a mechanical timer, which timer is adapted to terminate a toasting operation in accordance with the temperature of the toaster. To effect this, I provide a secondary source of heat spaced a relatively small distance from the main heating element of a toaster, this secondary source having a relatively small mass and heat storage capacity and being therefore adapted to follow very closely the temperature changes of a heat source with which it is operatively associated.

The device embodying my invention further provides a single means for varying or adjusting the speed of a variable speed mechanical timer in which the relative positions of a thermostat and a speed adjusting member remain constant for constant temperature conditions, thereby making it easy to design and adjust the thermally-controlled timing mechanism to adapt it for all of the operating conditions which a toaster of this kind may meet with in use.

The device embodying my invention provides a thermally-controlled mechanical timer in which the thermostat is normally free of outside mechanical stress whereby the continuance of the initial condition of the bimetal bar is ensured.

The thermostat is also shielded from any draft of cooling air since it is located in a substantially enclosed space namely that defined by the heating element on the one side and the side wall of the casing on the other side, the bottom plate 15 and the cover 21.

The thermostat is so designed and constructed that it has a negligible time lag relatively to temperature changes to which it is responsive, thereby ensuring accurate and quick change in its position in accordance with temperature changes controlling it.

Various modifications may be made in the device embodying my invention without departing from the spirit and scope thereof and I desire therefore that only such limitations shall be placed thereon as are imposed by the prior art or are set forth in the appended claims.

I claim as my invention:

1. In a toaster, the combination with an electric heating element, a control switch for the heating element biased to open position, a variable speed mechanical timer having means thereon connected to cause a change in timer speed when moved, means connected to simultaneously effect closing of the switch and winding of the timer and a latch adapted to hold the switch in closed position, of a thermally-actuable element supported solely from the timer and effective to operatively engage the speed changing means after a predetermined change of temperature to control the speed of the timer in accordance with changes in toaster temperature and means to simultaneously move the speed changing means and the thermally-actuable element while maintaining constant their initial positions relatively to each other.

2. In a toaster, the combination with an electric heating element, a control switch for the heating element biased to open position, a variable speed mechanical timer having a member thereon movable to cause a change in timer speed, means connected to simultaneously effect closing of the switch and winding of the timer and a latch adapted to hold the switch in closed position, of a bimetal thermostat normally free from outside mechanical stress, subject to toaster temperature and adapted to operatively engage the speed changing member to control the timer speed in accordance with changes in toaster temperature, a bracket on the timer movable relatively thereto constituting the sole support for the bimetal thermostat and means to effect movement of said bracket on the timer to vary the position of the speed changing member and thereby the speed of the timer while maintaining the b'metal thermostat normally free from outside mechanical stress.

3. In a toaster, the combination with an electric heating element, a control switch for the heating element biased to open position, a variable speed mechanical timer having thereon a pivotally mounted arm connected to cause a change in timer speed when moved, means connected to simultaneously effect closing of the switch and winding of the timer and latch means adapted to hold the switch in closed position, of a bimetal thermostat subject to toaster temperature, a cam surface on the bimetal thermostat out of engagement with the pivotally mounted arm when the bimetal thermostat is cold for engaging and moving said pivotally mounted arm to control the timer speed in accordance with changes in toaster temperature, a member on the timer movable relatively thereto, constituting the sole support for the bimetal thermostat and having a stop pin thereon engaged by the pivotally mounted arm and means to effect movement of said movable member on the timer to vary the position of said pivotally mounted arm and thereby the speed of the timer, the cold position of the cam surface relatively to the pivotally mounted arm being constant irrespective of the position of the pivotally mounted arm relatively to the timer.

4. In a toaster, the combination with a heating element and means to cause energization of the heating element, of means to effect deenergization of the heating element including a variable speed timer, an arm pivotally mounted on the timer and connected to cause a change in timer speed when moved, a manually-actuable bracket slidably mounted on the timer, a stop member fixedly mounted on the bracket, a spring to bias said pivotally mounted arm against said stop member, whereby movement of the bracket causes a change in timer speed during operation thereof and a bimetal element supported solely by said bracket normally out of operative engagement with said arm and subject to temperature changes in the toaster for operatively engaging said arm and varying the timer speed in accordance with changes of toaster temperature.

5. A toaster as set forth in claim 4 in which the manually-actuable bracket is effective to shift the position of the bimetal element relatively to the timer while maintaining unchanged the relative positions of the bimetal element and the pivotally mounted arm.

6. In a toaster, the combination with an electric heater and means to initiate a toasting operation, of means to terminate a toasting operation including a variable speed mechanical timer, an arm on the timer biased in one direction and connected to effect a change in timer speed when moved, a single manually-actuable bracket slidably mounted on the timer, supported solely thereby and operatively engaging said arm to limit movement thereof in said one direction and a bimetal element supported solely by said bracket in position to be subjected to toaster temperature and normally out of operative engagement with said arm, effective after a predetermined increase in temperature to operatively engage said arm and cause a speed change in the timer, the amount of said increase in temperature remaining the same irrespective of the position of the bracket.

7. In a toaster, the combination with an electric heater and means to initiate a toasting operation, of means to terminate a toasting operation including a variable speed mechanical timer, an arm on the timer biased in one direction and connected to effect a change in timer speed when moved, a single manually-actuable bracket slidably mounted on the timer, supported solely thereby and operatively engaging said arm to limit movement thereof in said one direction and a bimetal element supported solely by said bracket in position to be subjected to toaster temperature and normally out of operative engagement with said arm, effective after a predetermined increase in temperature to operatively engage said arm and cause a speed change in the timer, the relative positions of the bimetal element and of the arm on the timer remaining the same at constant temperature.

8. In a toaster, the combination with an electric heater and means to initiate a toasting operation, of means to terminate a toasting operation including a variable speed mechanical timer, an arm on the timer biased in one direction and connected to effect a change in timer speed when moved, a single manually-actuable bracket slidably mounted on the timer, supported solely thereby and operatively engaging said arm to limit movement thereof in said one direction and a bimetal element supported solely by said bracket in position to be subjected to toaster temperature and normally free of externally applied mechanical stress and effective after a predetermined increase in temperature to operatively engage said arm and cause a speed change in the timer, the amount of said increase in temperature remaining the same irrespective of the position of the bracket.

9. In a toaster, the combination with a heating element and means to cause energization of the heating element, of means to effect deenergization of the heating element including a variable speed timer, an arm pivotally mounted on the timer and connected to cause a change in timer speed when moved, a plurality of means supported solely from the timer and operable respectively manually and thermally for acting on said pivotally mounted arm to cause movement thereof, said thermally-operable means being supported solely by said manually operable means.

10. In a toaster, the combination with a heating element and means to cause energization of the heating element, of means to effect deenergization of the heating element including a variable speed timer, an arm pivotally mounted on the timer and connected to cause a change in timer speed when moved, a plurality of means supported solely from the timer and operable respectively manually and thermally for acting on said pivotally mounted arm to cause movement thereof, said manually-operable means being effective to shift the position of the thermally-operable means relatively to the timer, the relative positions of the thermally-operable means and of the pivotally mounted arm remaining the same during such shifting under constant temperature.

11. A device as set forth in claim 2 in which the bimetal thermostat consists of two integral bimetal bars of unequal lengths, normally coplanar, in side-by-side positions, the bracket supporting the free end of the shorter bar to locate the longer bar nearer to the heating means than the shorter bar, the free end of the longer bar moving to operatively engage said change speed member on increase of temperature to cause increase in timer speed with increase in toaster temperature, the shorter bar acting to nullify in part the engaging movement of the longer bar to cause the thermally controlled timer to operate to obtain substantially uniformly toasted slices of bread from the toaster.

12. A device as set forth in claim 2 in which the bimetal thermostat consists of two integral bimetal bars of unequal lengths, normally coplanar in side-by-side positions, the bracket supporting the free end of the shorter bar to locate the longer bar nearer to the heating means than the shorter bar, the free end of the longer bar moving to operatively engage said change speed member on increase of temperature to cause increase in timer speed with increase in toaster temperature, the shorter bar being effective to cause the longer bar to operate with negligible time lag in response to changes in toaster temperature.

13. A device as set forth in claim 3 in which the bimetal thermostat consists of two normally coplanar, unitary bimetal bars of unequal lengths and of substantially U-shape supported by said member on the timer at only the free end of the shorter bar in such position relatively to the electric heating element that the longer arm is in a zone of higher temperature than is the shorter arm, the cam surface being supported at the free end of the longer arm, the shorter arm counteracting in part the movement of the free end of the longer arm under temperature changes and cooperating with the cam surface as moved by the longer arm to cause successive slices of bread to be toasted uniformly by the toaster irrespective of changes of toaster temperature.

14. In a toaster, the combination with a heating element and means to cause initiation of a toasting operation, of means to cause termination of a toasting operation, including a variable speed timer, a single-arm lever pivotally mounted at one of its ends on the timer and connected therewith to cause a change in timer speed when moved, a manually-actuable means mounted on the timer and operatively engaging said lever arm at a predetermined distance from its pivot axis to cause movement thereof and a bimetal thermostat subject to toaster temperature and effective when heated to operatively engage said lever arm at substantially said predetermined distance from its pivot axis to cause movement of said lever arm.

15. A toaster as set forth in claim 14 in which the bimetal thermostat is supported solely by said manually-actuable means and in which a predetermined increase in temperature is necessary to cause operative engagement between the bimetal thermostat and the lever arm.

16. A device as set forth in claim 14 in which the bimetal thermostat is supported solely by said manually-actuable means and is normally out of operative engagement with said lever arm and in which the relative positions of the bimetal thermostat and its point of engagement on the lever arm remain unchanged during manual adjustment of the manually-actuable means at constant temperature.

17. In a toaster, the combination with a heating means and means to cause initiation of a slice of bread being toasted, of means to terminate a toasting operation including a variable speed timer, a single-arm lever pivotally mounted at one of its ends on the timer and connected therewith to cause a change in timer speed when moved, a manually-adjustable bracket slidably mounted on the timer operatively engaging said lever arm at a predetermined distance from its pivot axis to cause movement of the lever arm and a bimetal thermostat supported solely from said bracket, normally free from externally applied mechanical stress and effective on predetermined increase of its temperature to operatively engage said lever arm at substantially said predetermined distance from its pivot axis to cause movement of said lever arm, said predetermined increase of temperature being constant irrespective of the manually-effected adjustment of said lever arm.

18. In a toaster, the combination with an outer casing, a plurality of spaced heating elements in the casing, a pair of side walls positioned between the outer heating elements and the casing and means to initiate a toasting operation, of means to terminate a toasting operation comprising a variable speed mechanical timer, a single-arm lever pivotally mounted on the timer and connected to cause a change in timer speed when moved, a bimetal thermostat having the greater portion thereof positioned between one of said side walls and an adjacent heating element, relatively close to said heating element and effective when heated to operatively engage said single-arm lever to cause a change in speed of the timer and a metal plate having small thickness and mass and relatively high heat absorbing and heat radiating capacity located between said heating element and the thermostat to cause the latter to be subjected to reradiated heat originating in the heating element and having a relatively high temperature, said one side wall and the heating element adjacent thereto cooperating to cause the thermostat to be subjected to a convection current of heating air of relatively high temperature when the heating element is energized.

ROBERT SARDESON.